United States Patent
Hsu

(10) Patent No.: US 9,876,439 B2
(45) Date of Patent: Jan. 23, 2018

(54) ULTRA HIGH VOLTAGE REGULATOR

(71) Applicant: DiWIN technology CO. LTD, Taoyuan (TW)

(72) Inventor: Ching-Yueh Hsu, Taoyuan (TW)

(73) Assignee: DiWIN technology CO. LTD, Taoyuan (TW)

(\*) Notice: Subject to any disclaimer, the term of this patent is extended or adjusted under 35 U.S.C. 154(b) by 122 days.

(21) Appl. No.: 15/169,653

(22) Filed: May 31, 2016

(65) Prior Publication Data

US 2016/0276943 A1  Sep. 22, 2016

Related U.S. Application Data

(63) Continuation-in-part of application No. 14/571,311, filed on Dec. 16, 2014, now Pat. No. 9,379,637.

(30) Foreign Application Priority Data

Dec. 16, 2013 (TW) .............................. 102146381 A

(51) Int. Cl.
*H02M 7/217* (2006.01)

(52) U.S. Cl.
CPC .................. *H02M 7/217* (2013.01)

(58) Field of Classification Search
CPC .................................................. H02M 7/217
See application file for complete search history.

(56) References Cited

U.S. PATENT DOCUMENTS

| | | | | |
|---|---|---|---|---|
| 5,459,652 A * | 10/1995 | Faulk | ...................... | H02M 1/36 323/901 |
| 5,640,317 A * | 6/1997 | Lei | ......................... | H02M 1/36 363/49 |
| 6,804,126 B2 * | 10/2004 | Lucas | ...................... | H02M 1/36 363/20 |
| 6,912,140 B2 * | 6/2005 | Kasai | ...................... | H02M 1/36 323/901 |
| 7,432,690 B2 * | 10/2008 | Williams | ........... | H05B 37/0218 323/222 |
| 2010/0259952 A1 | 10/2010 | Zhu et al. | | |

\* cited by examiner

*Primary Examiner* — Jue Zhang
(74) *Attorney, Agent, or Firm* — ScienBiziP, P.C.

(57) ABSTRACT

An ultra high voltage regulator includes a rectifying circuit, a first transistor, a second transistor, an output capacitor, a bootstrap diode, a bootstrap capacitor, and a gate driver circuit. The ultra high voltage regulator converts a received alternative current into a direct voltage to an electrical component. The ultra high voltage regulator is capable of providing a larger current becomes more compact and thinner in size without cooperating with a mass transformer/high voltage capacitor, which satisfies the request for miniaturization of the electrical components.

19 Claims, 17 Drawing Sheets

ULTRA HIGH VOLTAGE REGULATOR

CROSS-REFERENCE TO RELATED APPLICATIONS

This application claims priority to Taiwanese Patent Application No. 102146381, filed on Dec. 16, 2013, and is a continuation-in-part of U.S. application Ser. No. 14/571,311, filed Dec. 16, 2014, the contents of which are incorporated by reference herein.

FIELD

The subject matter herein relates to an ultra high voltage regulator.

BACKGROUND

A linear type AC/DC power supply and a switching type AC/DC power supply are widely used. The linear type AC/DC power supply receiving a high voltage and a large current (more than 10 mA) needs mass heat dissipation, and the converting efficiency of the linear type AC/DC power supply is decreased. With an improved converting efficiency, the circuit structures of the switching type AC/DC power supply can be a non-isolated buck-boost circuit, an isolated flyback circuit, a non-isolated buck circuit, an isolated forward circuit, or a push-pull circuit. However, the isolated circuit cooperates with a mass transformer, and the ground in the non-isolated circuit is a fire wire of the alternating current, a neutral line, or a floating ground.

BRIEF DESCRIPTION OF THE FIGURES

Implementations of the present technology will now be described, by way of example only, with reference to the attached figures.

DETAILED DESCRIPTION

Figure 1:
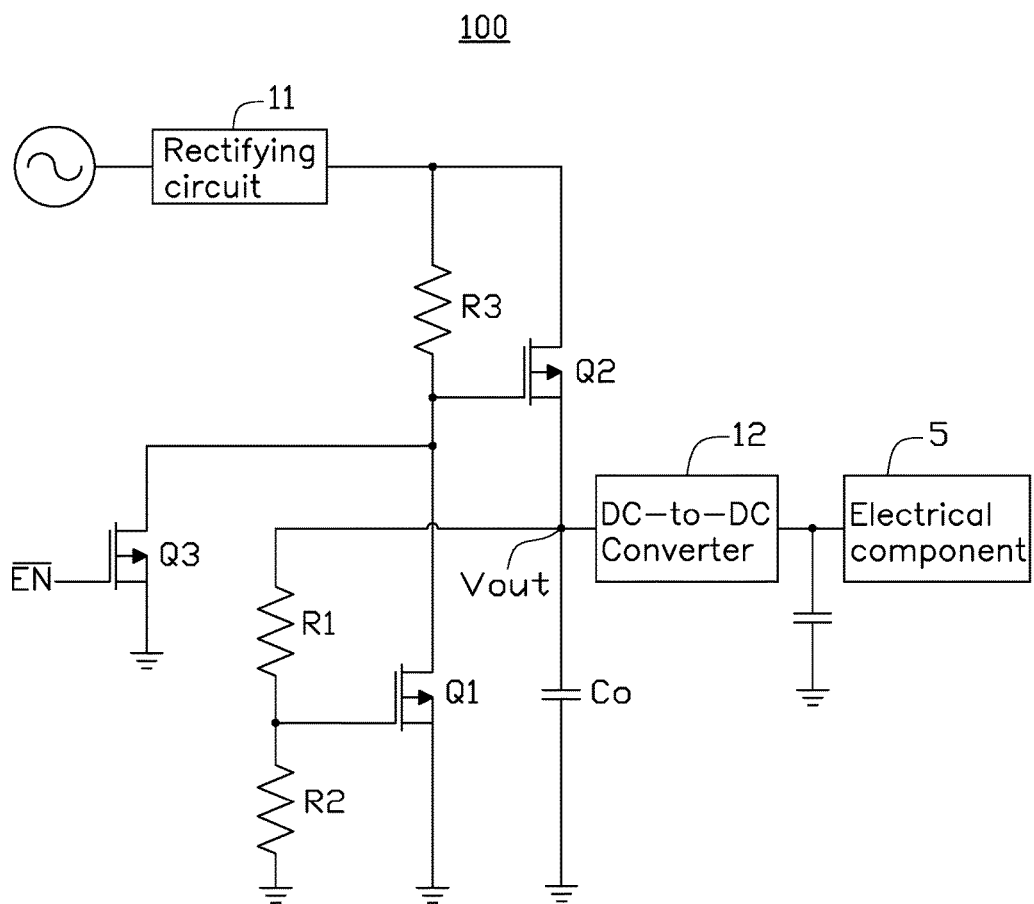
FIG. 1 is a diagrammatic view of an embodiment of an ultra high voltage regulator.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series and the like. The switch element can be for example a Bipolar Junction Transistor (BJT) or a Metal-Oxide-Semiconductor Field Effect Transistor (MOSFET). In order to conveniently describe, the MOSFET is employed in each embodiment.

The present disclosure is described in relation to an ultra high voltage regulator.

FIG. 1 illustrates an embodiment of an ultra high voltage regulator 100. The ultra high voltage regulator 100 includes an input terminal for receiving an alternating (AC) voltage (such as 110 V) and an output terminal for outputting a direct voltage Vout. The ultra high voltage regulator 100 further includes a DC-to-DC converter (or a linear voltage regulator) 12 for outputting a lower voltage (e.g. 5 volts or 3.3 volts) to a power terminal of an electronic component 5.

The ultra high voltage regulator 100 further includes a rectifying circuit 11, a first transistor Q1, a second transistor Q2, a third transistor Q3, an output capacitor Co, a first resistor R1, a second resistor R2, and a third resistor R3.

The rectifying circuit 11 is a full bridge rectifying circuit. The rectifying circuit 11 generates a rectifying signal based on the received AC voltage. A waveform of the rectifying signal is shown in channel 2 of FIG. 5. The first transistor Q1 includes a first reference terminal (drain electrode), a first driving terminal (source electrode), and a first controlling terminal (gate electrode). The second transistor Q2 includes a second reference terminal (drain electrode), a second driving terminal (source electrode), and a second controlling terminal (gate electrode). The second reference terminal is electrically connected to the rectifying circuit 11 for receiving the rectifying signal. The second controlling terminal is electrically connected to the first reference terminal. The second driving terminal is electrically connected to the output terminal. Opposite terminals of the first transistor R1 are respectively electrically connected to the first controlling terminal and the output capacitor Co. Opposite terminals of the second transistor R2 are respectively electrically connected to the first controlling terminal and the ground. Opposite terminals of the third transistor R3 are respectively electrically connected to the second controlling terminal and the second reference terminal. The first driving terminal is grounded.

The ultra high voltage regulator 100 further includes a starting switch Q3. The starting switch Q3 includes a third controlling terminal, a third driving terminal, and a third reference terminal. The third driving terminal is grounded. The third reference terminal is electrically connected between the third resistor R3 and the first reference terminal. When the third controlling terminal receives an enable signal (EN) at a high level, the starting switch Q3 turns on, which causes the second controlling terminal to be grounded. The second transistor Q2 turns off. On the contrary, when the starting switch Q3 turns off, the second transistor Q2 turns on.

An operation method of the ultra high voltage regulator 100 is described as follows.

At a first phase, the starting switch Q3 and the first transistor Q1 turn off, and a current passing through the third resistor R3, which causes the second transistor Q2 turn on. The output capacitor Co charges, increasing the output voltage Vout of the output terminal.

At a second phase, a voltage difference Vgs1 between the first controlling terminal and the first driving terminal is calculated by the equation Vout*R2/(R1+R2). When the Vgs1 is greater than a threshold voltage Vth, the first transistor Q1 turns on and the current passing through the third resistor R3 and the first transistor Q1, which causes a voltage difference Vgs2 between the second controlling terminal and the second driving terminal to be decreased. The second transistor Q2 turns off. The voltage Vout of the output terminal is equal to Vth*(R1+R2)/R2.

At a third phase, the electrical component 5 discharges, which causes the voltage difference Vgs1 of the first transistor Q1 to be decreased. The first transistor Q1 turns off. The voltage difference Vgs2 of the second transistor Q2 increases (an internal capacitor Cgs is charged via the third resistor R3) and returns to the first phase for charging the output capacitor Co to increase the output voltage Vout of the output terminal.

Because a voltage at the output terminal Vout is ranged from, for example, about 6V to 10V, the ultra high voltage regulator 100 further includes a DC-to-DC converter (or a linear voltage regulator) 12 connected between the output capacitor Co and the electrical component 5 for satisfying with the voltage requirement of the electrical component 5.

The ultra high voltage regulator 100 of the embodiment becomes smaller and thinner in size without cooperating with a mass transformer/high voltage capacitor as an assembly.

Figure 2:
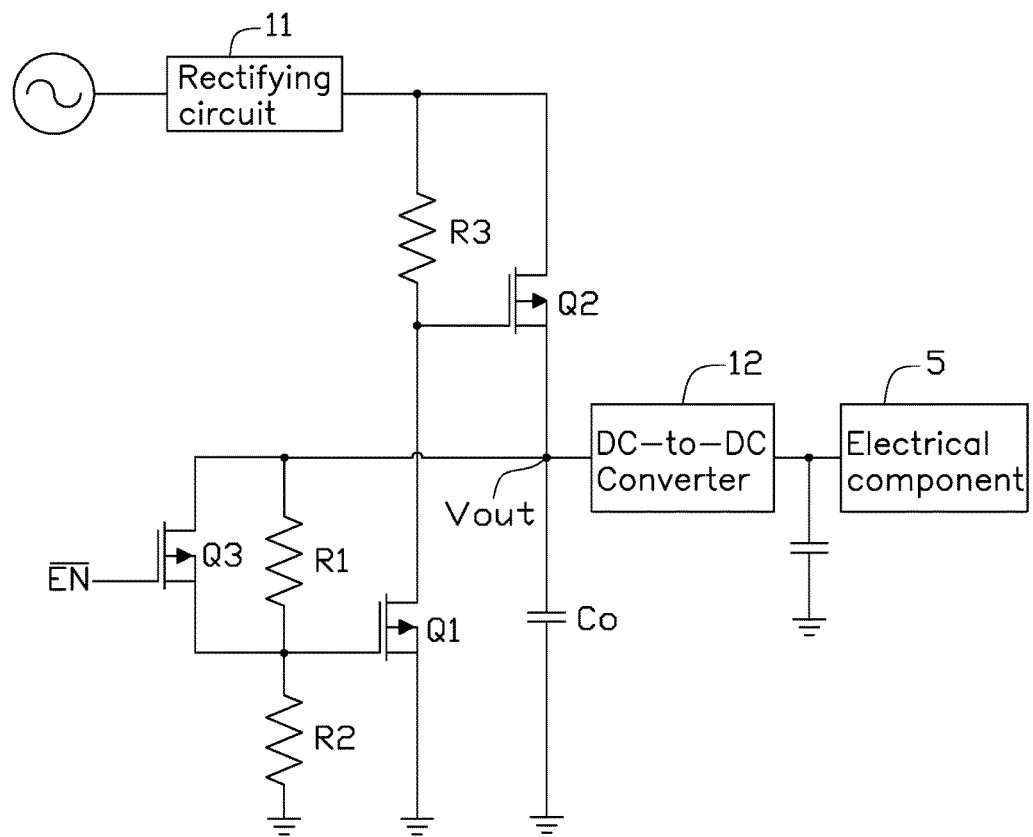
FIG. 2 is a diagrammatic view of a second embodiment of the ultra high voltage regulator.

FIG. 2 illustrates a second embodiment of the ultra high voltage regulator 200 with a similar circuit structure of the first embodiment, the difference includes: the starting switch Q3 is a transistor, which is different from the starting switch Q3 in the first embodiment. The starting switch Q3 includes a third controlling terminal, a third driving terminal, and a third reference terminal. The third driving terminal is electrically connected to the first controlling terminal of the first transistor Q1. The third reference terminal is electrically connected to the output terminal and the first resistor R1. When the third driving terminal receives the high level enable signal ($\overline{EN}$), the starting switch Q3 turns on, which causes the first transistor Q1 to be turned on. The second transistor Q2 turns off.

Figure 3:
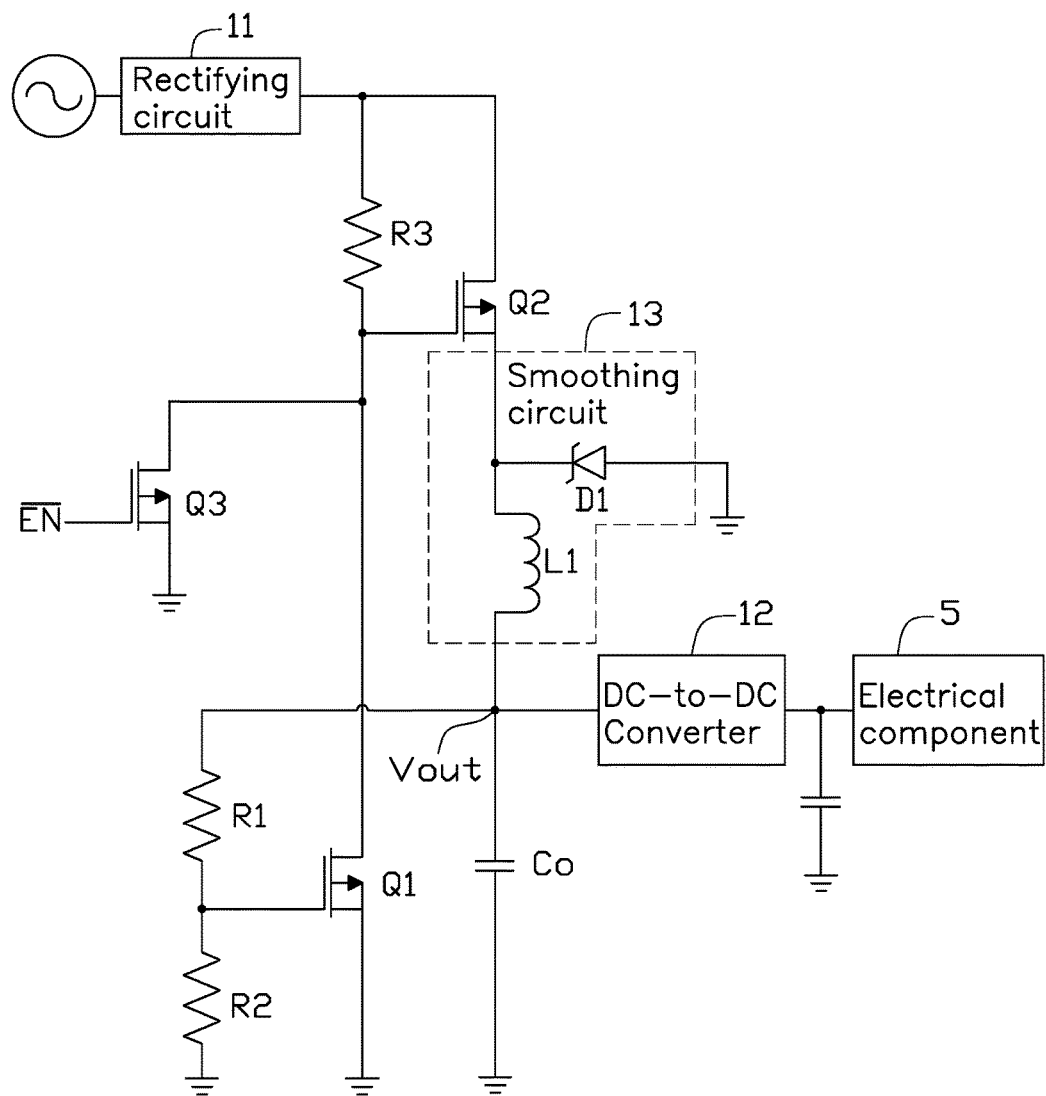
FIG. 3 is a diagrammatic view of a third embodiment of the ultra high voltage regulator.

FIG. 3 illustrates a third embodiment of the ultra high voltage regulator 300 similar to the first embodiment. The ultra high voltage regulator 300 also includes a rectifying circuit 11, a first transistor Q1, a second transistor Q2, a first resistor R1, a second resistor R2, a third resistor R3, and an output capacitor Co. The ultra high voltage regulator 300 further includes a smoothing circuit 13, which is different from the ultra high voltage regulator 100. The smoothing circuit 13 is connected to a second driving terminal of the second transistor Q2, an output terminal of the ultra high voltage regulator 300, and the ground.

The rectifying circuit 11 generates a rectifying signal based on the received the AC current. A waveform of the rectifying signal is shown in channel 2 of FIG. 5. In this one embodiment, the rectifying circuit 11 is a full bridge rectifying circuit 11. The first transistor Q1 includes a first reference terminal, a first driving terminal, and a first controlling terminal. The second transistor Q2 includes a second reference terminal, a second driving terminal, and a second controlling terminal. The second reference terminal is electrically connected to the output terminal of the rectifying circuit 11 for receiving the rectifying signal. A terminal of the first resistor R1 is electrically connected between the output terminal and the smoothing circuit 13, and an opposite terminal of the first resistor R1 is electrically connected to the first controlling terminal. Opposite terminals of the second transistor R2 are respectively electrically connected to the first controlling terminal and the ground. Opposite terminals of the third transistor R3 are respectively electrically connected to the second controlling terminal and the first reference terminal.

The smoothing circuit 13 is coupled to the second driving terminal (the source electrode) of the second transistor Q2, the output terminal of the ultra high voltage regulator 300, and the ground and is configured to smooth a waveform of the voltage. In at least one embodiment, the smoothing circuit 13 includes an inductor L1 and a flyback diode D1. One terminal of the output capacitor Co is electrically connected to the output terminal, and an opposite terminal of the output capacitor Co is grounded. One terminal of the inductor L1 is electrically connected to the output terminal, and opposite terminal of the inductor L1 is electrically connected to the second driving terminal. A cathode of the flyback diode D1 is electrically connected to the second driving terminal (source electrode), and an anode of the flyback diode D1 is grounded.

Figure 4:
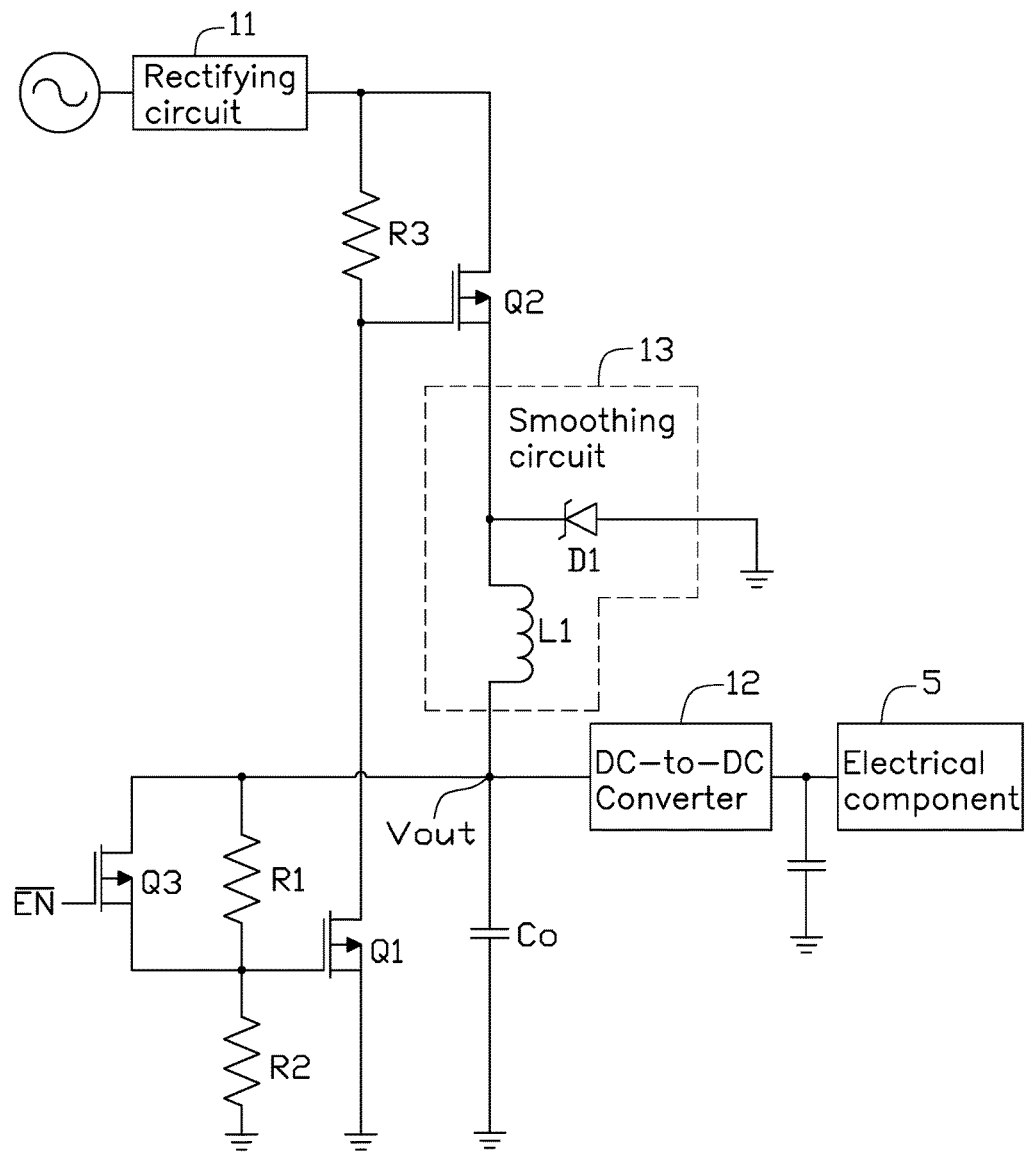
FIG. 4 is a diagrammatic view of a fourth embodiment of the ultra high voltage regulator.

FIG. 4 illustrates a fourth embodiment of the ultra high voltage regulator 400 similar to the third embodiment. A starting switch Q3 of the ultra high voltage regulator 400 is a transistor, which is different from the ultra high voltage regulator 300. A third driving terminal of the starting switch Q3 is electrically connected to a first controlling terminal of a first transistor Q1. A third reference terminal of the starting switch Q3 is electrically connected to an output terminal of the ultra high voltage regulator 400. When the third driving terminal of the starting switch Q3 receives the high level enable signal ($\overline{EN}$), the starting switch Q3 turns on, which causes the first transistor Q1 to be turned on, and a second transistor Q2 to be turned off.

Figure 5:
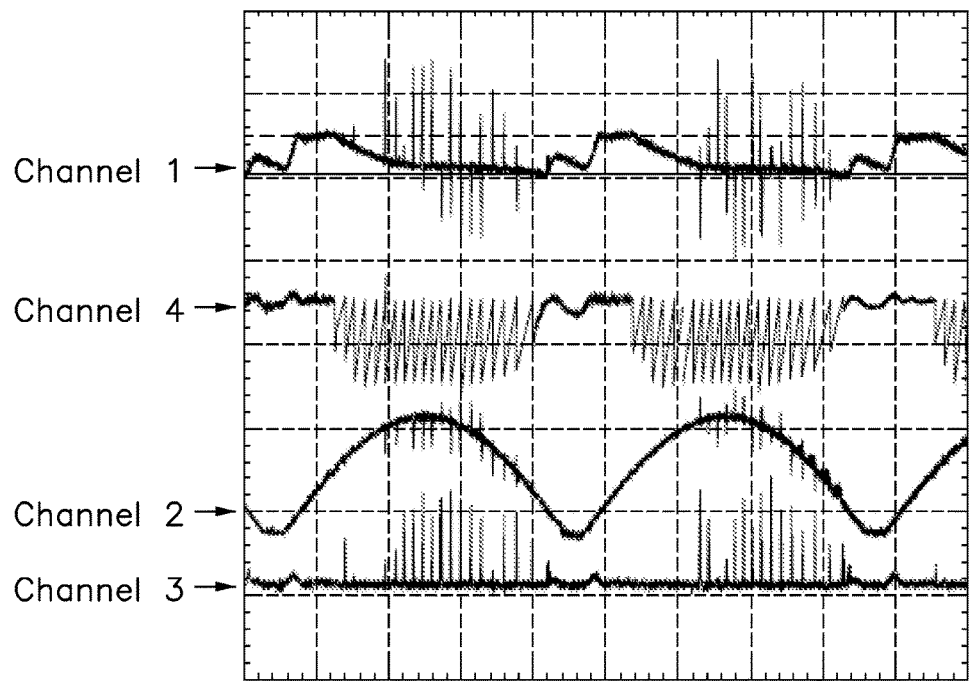
FIG. 5 is waveforms of an embodiment of four parameters of the ultra high voltage regulator of FIG. 1 under a condition of a 100 V AC voltage and a 17 mA.

FIG. 5 illustrates waveforms of the output voltage (channel 1), the enable signal (channel 2), the input current (channel 3), and the voltage difference Vgs2 (channel 4) of the ultra high voltage regulator 100 under a 100 V AC voltage and a 17 mA. A ripple can be eliminated by a linear voltage regulator added on the output terminal. The output voltage is 8.5V and the output current is 17 mA.

Figure 6:
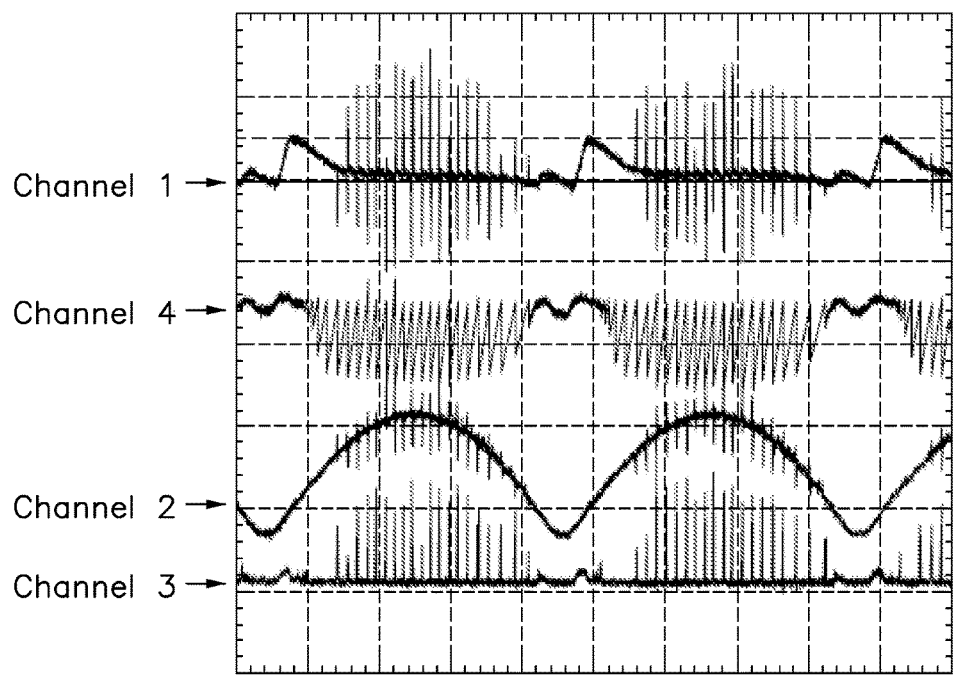
FIG. 6 is waveforms of an embodiment of four parameters of the ultra high voltage regulator of FIG. 2 under a condition of a 100 V AC voltage and a 22 mA.

FIG. 6 illustrates waveforms of the output voltage (channel 1), the enable signal (channel 2), the input current (channel 3), and the voltage difference Vgs2 (channel 4) of the ultra high voltage regulator 100 under a 100V AC voltage and a 22 mA output current. The output voltage is 7.2V and the output current is 22 mA.

Figure 7:
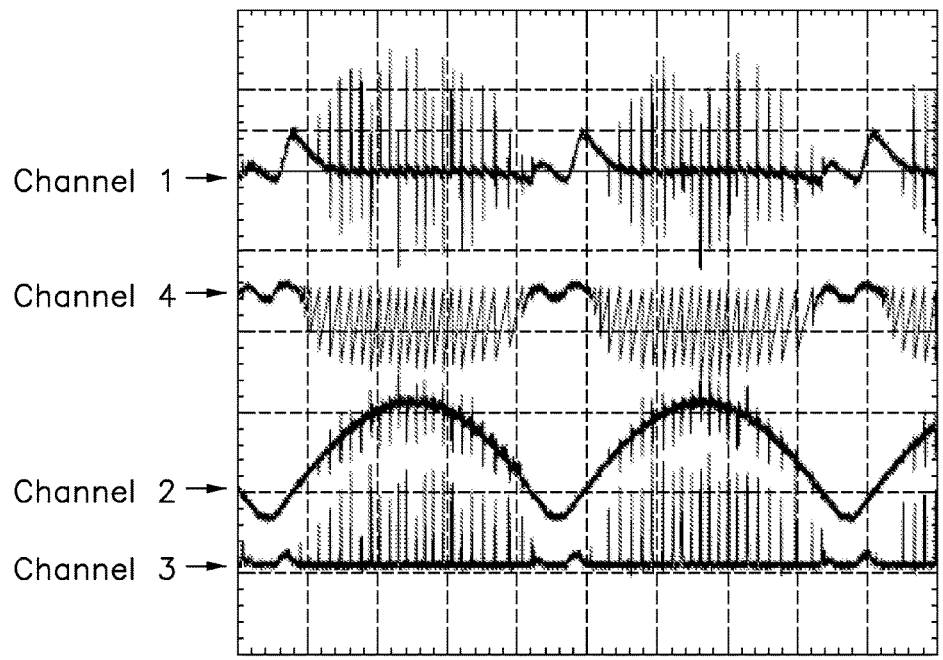
FIG. 7 is waveforms of an embodiment of four parameters of the ultra high voltage regulator of FIG. 3 under a condition of a 100 V AC voltage and a 31 mA.

FIG. 7 illustrates waveforms of the output voltage (channel 1), the enable signal (channel 2), the input current (channel 3), and the voltage difference Vgs2 (channel 4) of the ultra high voltage regulator 100 under a 100V AC voltage and a 31 mA output current. The output voltage is 6.7V and the output current is 31 mA.

The circuit structures of the ultra high voltage regulators 100, 200, 300 and 400 in the four embodiments are suitable for use in a lower power controlling structure. The circuit structure of the ultra high voltage regulators in the fifth, sixth, and seventh embodiments as shown below are suitable for use in a larger power controlling structure.

Figure 8:
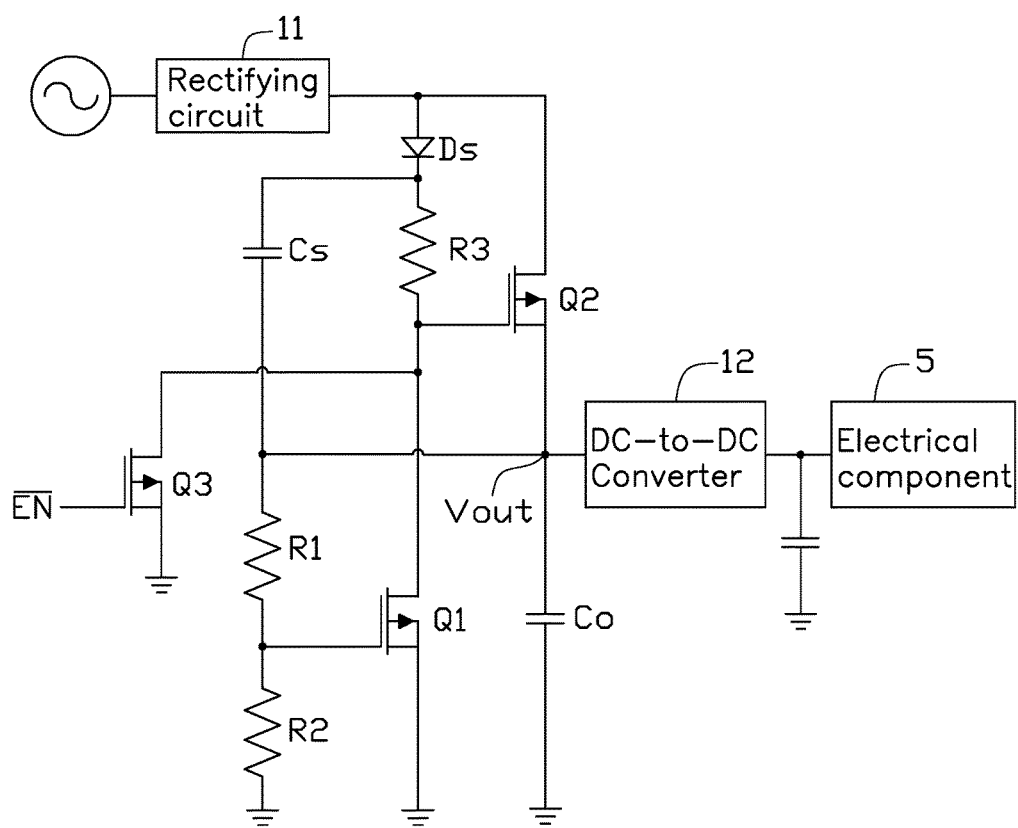
FIG. 8 is a diagrammatic view of a fifth embodiment of the ultra high voltage regulator.

FIG. 8 illustrates a fifth embodiment of the ultra high voltage regulator 500 with a similar structure of the ultra high voltage regulator 100. The ultra high voltage regulator 500 further includes a bootstrap diode Ds and a bootstrap capacitor Cs. An anode of the bootstrap diode Ds is electrically connected to an output terminal of the rectifying circuit 11, and a cathode of the bootstrap diode Ds is electrically connected to the third resistor R3. One terminal of the bootstrap capacitor Cs is electrically connected to the cathode of the bootstrap diode Ds, and an opposite terminal of the bootstrap capacitor Cs is electrically connected to the output terminal and the first resistor R1. The switching speed of the second transistor Q2 and the converting efficiency of the ultra high voltage regulator 500 are improved.

Figure 9:
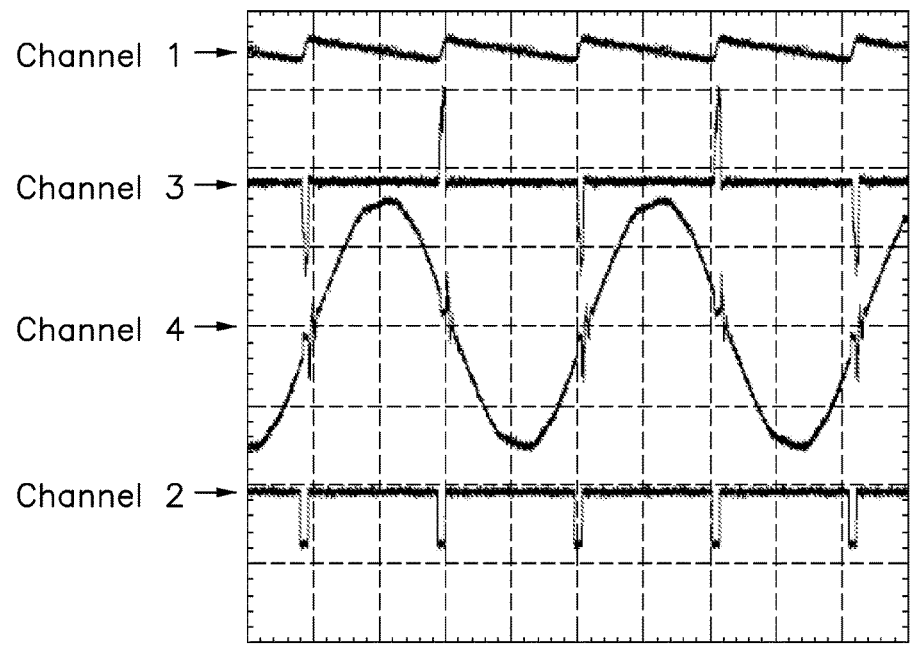
FIG. 9 is waveforms of an embodiment of four parameters of the ultra high voltage regulator of FIG. 8 under a condition of a 100 V AC voltage and a 100 mA.

FIG. 9 illustrates waveforms of the output voltage (channel 1), the enable signal (channel 2), the input current (channel 3), and the input voltage (channel 4) of the ultra high voltage regulator 500 under a 100V AC voltage and a 100 mA output current. The output voltage is 0V and the output current is 100 mA. Moreover, when a frequency signal (e.g. $\overline{EN}$) is applied to the third control signal, a transfer efficiency of the ultra high voltage regulator 500 is improved under the control of the frequency signal.

Figure 10:
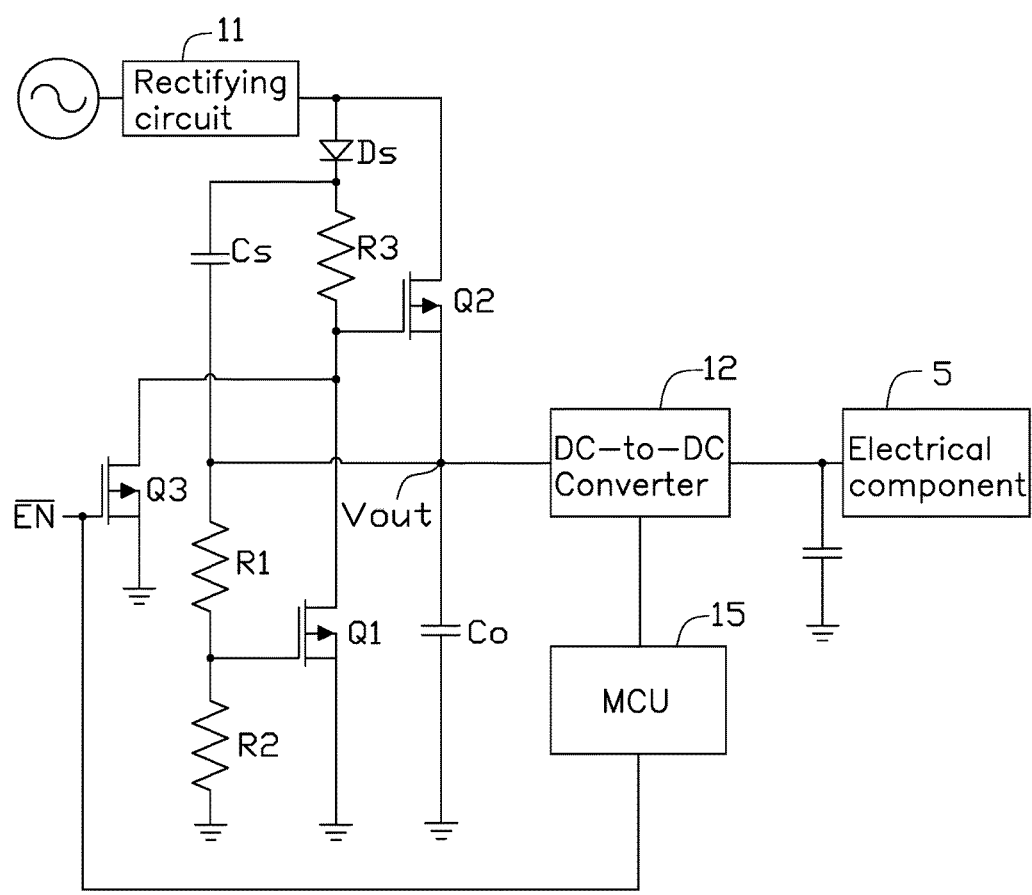
FIG. 10 is a diagrammatic view of sixth and seventh embodiments of the ultra high voltage regulator.

FIG. 10 illustrates a sixth embodiment of the ultra high voltage regulator 600 with a similar circuit structure of the ultra high voltage regulator 100. The ultra high voltage regulator 600 further includes a micro control unit (MCU) 15. One terminal of the MCU 15 is electrically connected to the output terminal, and another terminal of the MCU 15 is electrically connected to the enable signal ($\overline{EN}$). The MCU 15 detects a voltage Vout of the output terminal or a voltage slope of the output terminal as a feedback data to be calculated for adjusting a frequency of the enable signal ($\overline{EN}$), which causes the third transistor Q3 and the second transistor Q2 to be turned on or turned off. For example, when being powered on with a 50 hertz (Hz) constant frequency and a 10 milliseconds (ms) time interval, the enable signal ($\overline{EN}$), the MCU 15 adjusts the frequency of the enable signal ($\overline{EN}$) based on calculating and analyzing the detected voltage Vout of the output terminal. Until the voltage slope of the output terminal changes the frequency of the enable signal ($\overline{EN}$) to be zero or a negative value, as a standard frequency, and the MCU 15 keeps outputting the enable signal ($\overline{EN}$) with the standard frequency, which triggers the third transistor Q3 and controls the second transistor Q2 to be turned on or turned off for charging or discharging the output capacitor Co. The switching speed of the second transistor Q2 and the converting efficiency of the ultra high voltage regulator 600 are improved.

FIG. 10 also illustrates a seventh embodiment of the ultra high voltage regulator 600 with a similar structure of the ultra high voltage regulator 100. The ultra high voltage regulator 600 further includes a micro control unit (MCU) 15. One terminal of the MCU 15 is electrically connected to the output terminal, and another terminal of the MCU 15 is electrically connected to a terminal for inputting the enable signal ($\overline{EN}$). The MCU 15 detects a current of the output terminal as a feedback data calculated for adjusting a frequency of the enable signal ($\overline{EN}$), which causes the third transistor Q3 and the second transistor Q2 to be turned on or turned off. For example, when being powered on with a 50 Hz constant frequency and a 10 ms time interval, the enable signal ($\overline{EN}$), the MCU 15 adjusts the frequency of the enable signal ($\overline{EN}$) based on calculation and analyzing of the detected current of the output terminal. When a current outputted by the second transistor Q2 to the output capacitor Co reaches zero value, the frequency of the enable signal ($\overline{EN}$) is recognized as a standard frequency, and the MCU 15 keeps the enable signal ($\overline{EN}$) with the standard frequency which causes the third transistor Q3 to control the second transistor Q2 to be turned on or turned off for charging or discharging the output capacitor Co. The current outputted by the second transistor Q2 can be increase from a negative value to zero, or decrease from a positive to zero. The switching speed of the second transistor Q2 and the converting efficiency of the ultra high voltage regulator 600 are improved.

The ultra high voltage regulators 100, 200, 300, 400, and 500 respectively include the rectifying circuit 11, the first transistor Q1, the second transistor Q2, the output capacitor Co, a first resistor R1, a second resistor R2, and a third resistor R3. The ultra high voltage regulators 100, 200, 300, 400, and 500 convert the received AC into larger magnitudes DC provided to the electrical component 5, and the size of the ultra high voltage regulators 100, 200, 300, 400, and 500 become more compact and thinner in size in relation to a voltage regulator with an larger insulated type circuit structure. The ultra high voltage regulators 100, 200, 300, 400, and 500 without a high voltage capacitor are used in a smart socket, a smoke detector, a smart switch, or a wireless sensor of a home automation network (HAN) system.

For switching the transistor Q2 under a heavy load, a large current, for example 0.1 A, must be input to the gate of the transistor Q2. If an open drain structure including transistor Q3 and resistor R3 is applied to drive the gate of the transistor Q2, the power consumption of the resistor R3 is V*0.1 A, which is quite a lot under a high voltage situation. Therefore, a gate driver circuit of low power consumption is desired.

Figure 11:
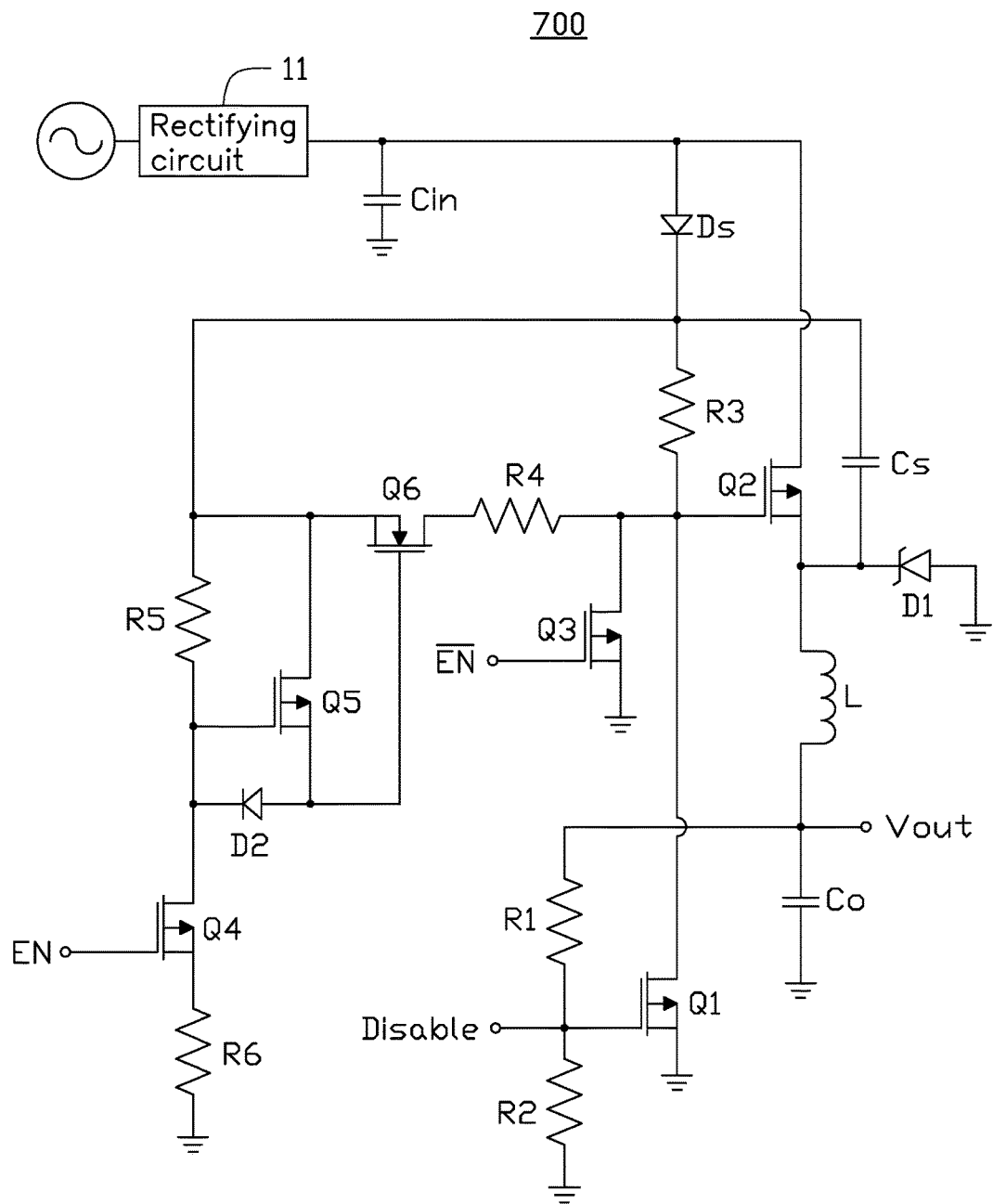
FIG. 11 is a diagrammatic view of an eighth embodiment of the ultra high voltage regulator.

FIG. 11 illustrates an eighth embodiment of the ultra high voltage regulator 700 which has a similar structure of the ultra high voltage regulator 100. A capacitor Cin is connected between an output of the rectifying circuit 11 and the ground. An anode of a bootstrap diode Ds is electrically connected to the output terminal of the rectifying circuit 11, and a cathode of the bootstrap diode Ds is electrically connected to a terminal of the resistor R3. Another terminal of the resistor R3 is connected to the gate of the transistor Q2. A bootstrap capacitor Cs is connected between the source of the transistor Q2 and the cathode of the bootstrap diode Ds. A flyback diode D1 has an anode grounded and a cathode connected to the source of the transistor Q2. The source of the transistor Q2 is connected to the ground via an inductor L and a capacitor Co connected in series. A node between the inductor L and the capacitor Co acts as the output terminal for outputting a direct voltage Vout, and the node is also connected to the ground via resistors R1, R2 connected in series. The node between the resistors R1, R2 is connected to the gate of the transistor Q1, and also connected to a disable terminal. The drain of the transistor Q3 is connected to the gate of the transistor Q2. The gate of the transistor Q3 is connected to an enable signal ($\overline{EN}$). A large-current gate driver circuit including transistors Q4, Q5, Q6 and a resistor R4 is applied to the gate of the transistor Q2. A gate of the transistor Q4 is connected to an enable signal ($\overline{EN}$). A drain of the transistor Q4 is connected to a gate of the transistor Q5. A source of the transistor Q4 is connected to the ground via a resistor R6. The gate of the transistor Q5 is connected to the source of the transistor Q6 via a resistor R5. The source of the transistor Q5 is connected to the gate of the transistor Q5 via a diode D2. The drain of the transistor Q5 is connected to a source of the transistor Q6, and is also connected to the cathode of the bootstrap diode Ds. A gate of the transistor Q6 is connected to a source of the transistor Q5. A drain of the transistor Q6 is connected to the gate of the transistor via a resistor R4.

Generally, the peak voltage output from the rectifying circuit 11 is about 373 V. The voltage over the bootstrap capacitor Cs is about 370 V in an extreme situation, therefore a large volume capacitor Cs and a high voltage transistor Q6 are needed. When the transistor Q2 is turned on, voltage over the inductor L can reach 370 V. In the extreme situation when the transistor Q2 is turned on, the voltage over the transistor Q4 can be the sum of 370 V voltage on the inductor L and 370 V voltage on the bootstrap capacitor Cs. Therefore, a transistor Q4 with a 1200 V withstand voltage is needed.

Figure 12:
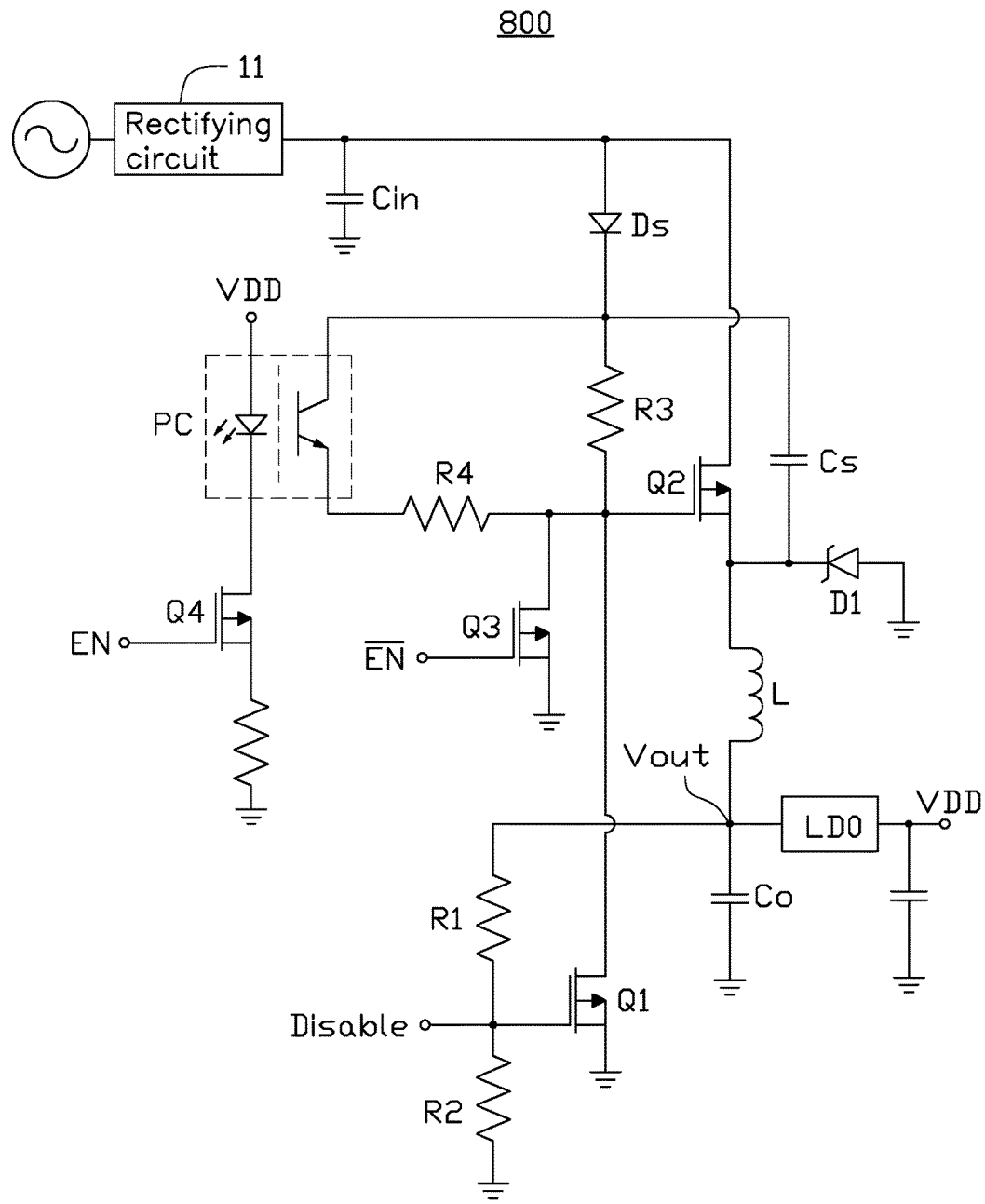
FIG. 12 is a diagrammatic view of a ninth embodiment of the ultra high voltage regulator.

FIG. 12 illustrates a ninth embodiment of the ultra high voltage regulator 800 with a similar structure of the ultra high voltage regulator 700. The differences includes: a gate driver circuit including a photo coupler PC, a transistor Q4, and a resistor R4 is applied to the gate of the transistor Q2. A photo coupler diode has an anode receiving a control voltage VDD and a cathode connected to the drain of the transistor Q4. A photo coupler transistor has a drain connected the cathode of the bootstrap diode Ds and a source connected to the gate of the transistor Q2 via a resistor R4. An input of a low-dropout regulator LDO is connected the output terminal Vout of the ultra high voltage regulator 800, and an output of the low-dropout regulator LDO outputs a low-dropout direct voltage VDD to an anode of the photo coupler diode. However, a photo coupler with a 400 V withstand voltage is needed.

Figure 13:
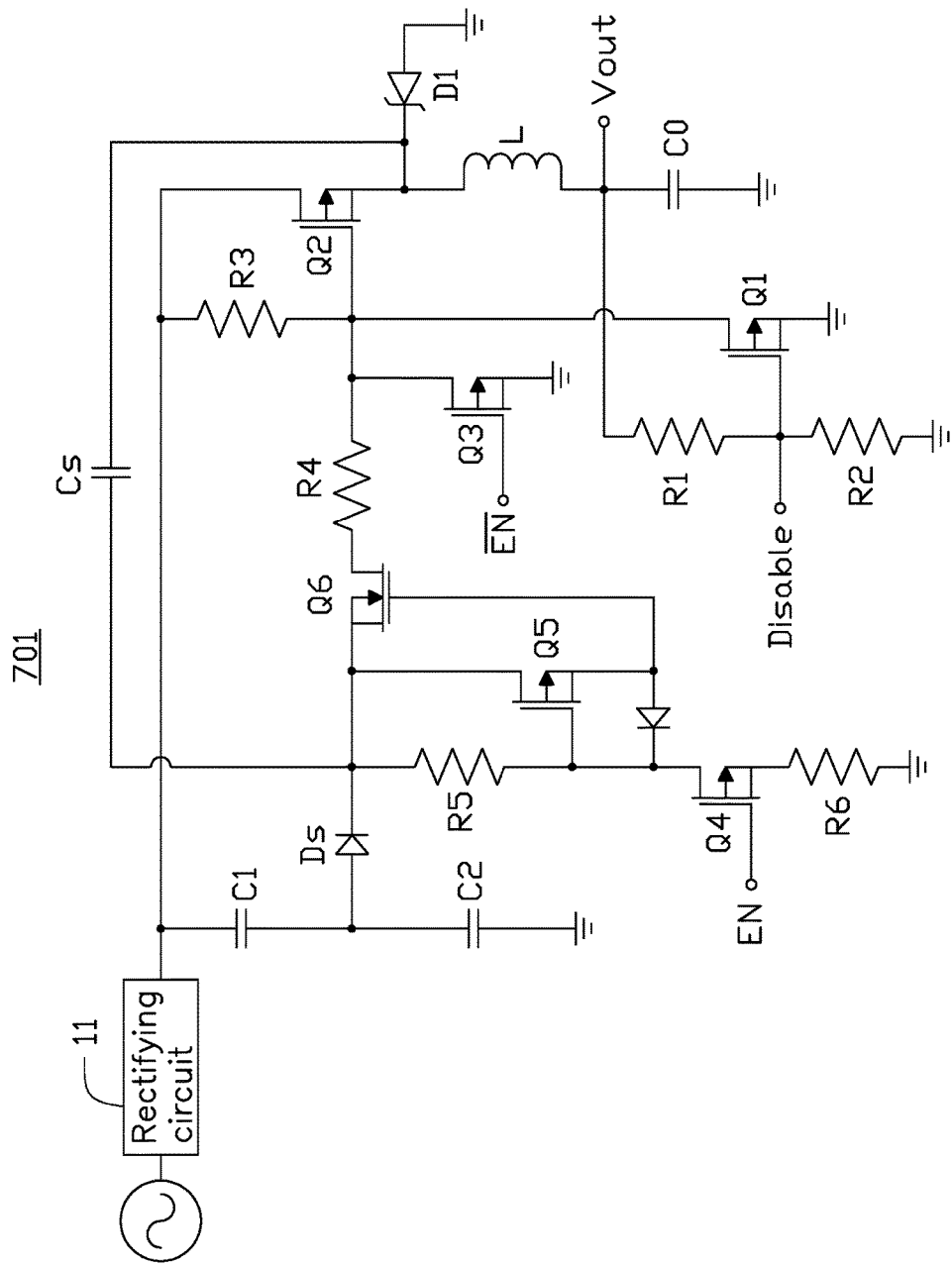
FIG. 13 is a diagrammatic view of a tenth embodiment of the ultra high voltage regulator.

To solve the problem of high withstand voltage transistor, a tenth embodiment of the ultra high voltage regulator 701 as illustrated in FIG. 13 is provided. The ultra high voltage regulator 701 is similar to the ultra high voltage regulator 700, but having the capacitor Cin replaced by two capacitors C1, C2 connected in series. In this circumstance, the voltage on the capacitor C2 is: Vc2=C1/(C1+C2). A low voltage capacitor C2 can be chosen to make the voltage Vc2 be 15V to 30V. An anode of the bootstrap diode Ds is connected to the node between the capacitors C1, C2. The improved ultra high voltage regulator 701 has the advantages of: the bootstrap capacitor Cs can be a low withstand voltage capacitor which has small volume; the transistor Q6 can have low withstand voltage, for example, 60V; and the transistor Q4 can have a withstand voltage of 600V.

Figure 14:
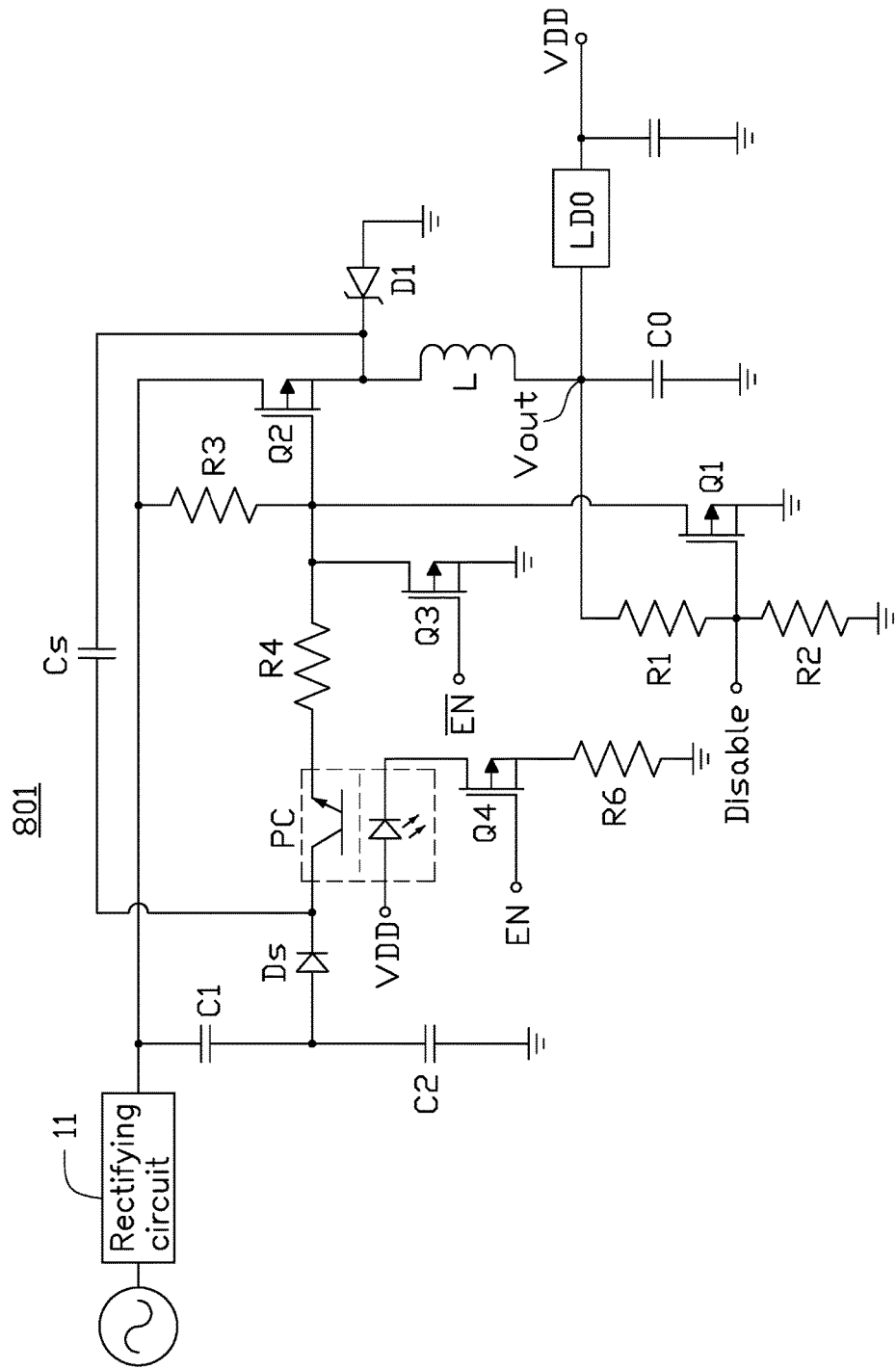
FIG. 14 is a diagrammatic view of an eleventh embodiment of the ultra high voltage regulator.

FIG. 14 illustrates an eleventh embodiment of the ultra high voltage regulator 801 with a similar structure of the ultra high voltage regulator 800. The differences between the ultra high voltage regulators 801 and 800 include: the capacitor Cin of the regulator 800 replaced by two capacitors C1, C2 connected in series; and the anode of the bootstrap diode Ds of the regulator 801 connected to the node between the capacitors C1, C2.

Figure 15:
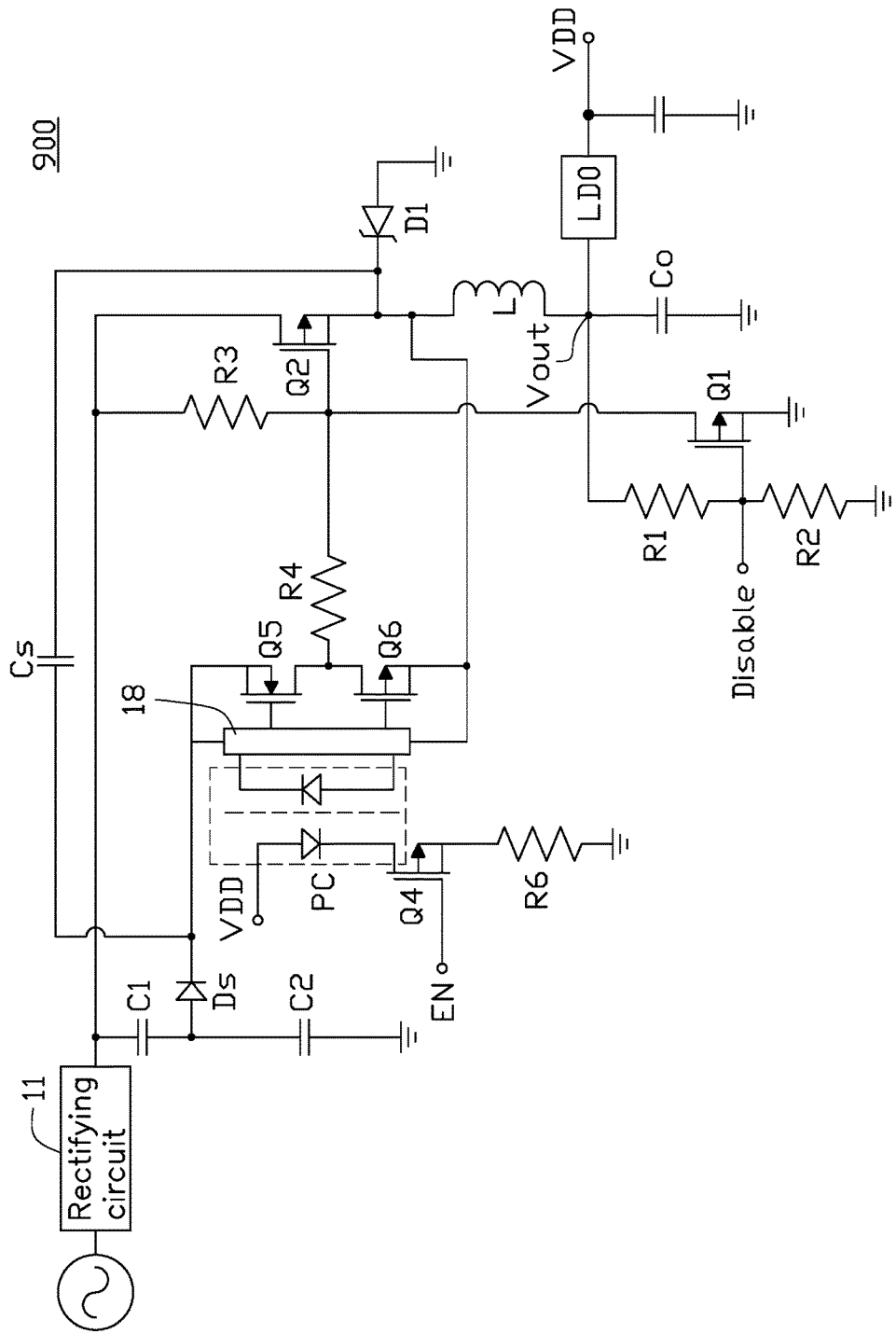
FIG. 15 is a diagrammatic view of a twelfth embodiment of the ultra high voltage regulator.

FIG. 15 illustrates a twelfth embodiment of the ultra high voltage regulator 900 with a similar structure of the ultra high voltage regulator 801, but includes another embodiment of the photo coupler PC for driving large power transistor. The differences between the ultra high voltage regulators 900 and 801 include: the transistor Q3 is omitted; the photo coupler transistor is replaced by a pin diode; an amplifier and level shifter 18 is connected to two ends of the pin diode; and two transistors Q5, Q6 have gates connected to two outputs of the amplifier and level shifter 18, respectively, a source of the transistor Q5 is connected to the cathode of the bootstrap diode Ds, a source of the transistor Q6 is connected to the source of the transistor Q2, the sources of the transistors Q5, Q6 are connected to the amplifier & level shifter 18, drains of the transistor Q5, Q6 are connected to each other and also to the gate of the transistor Q2 via the resistor Q4.

Figure 16:
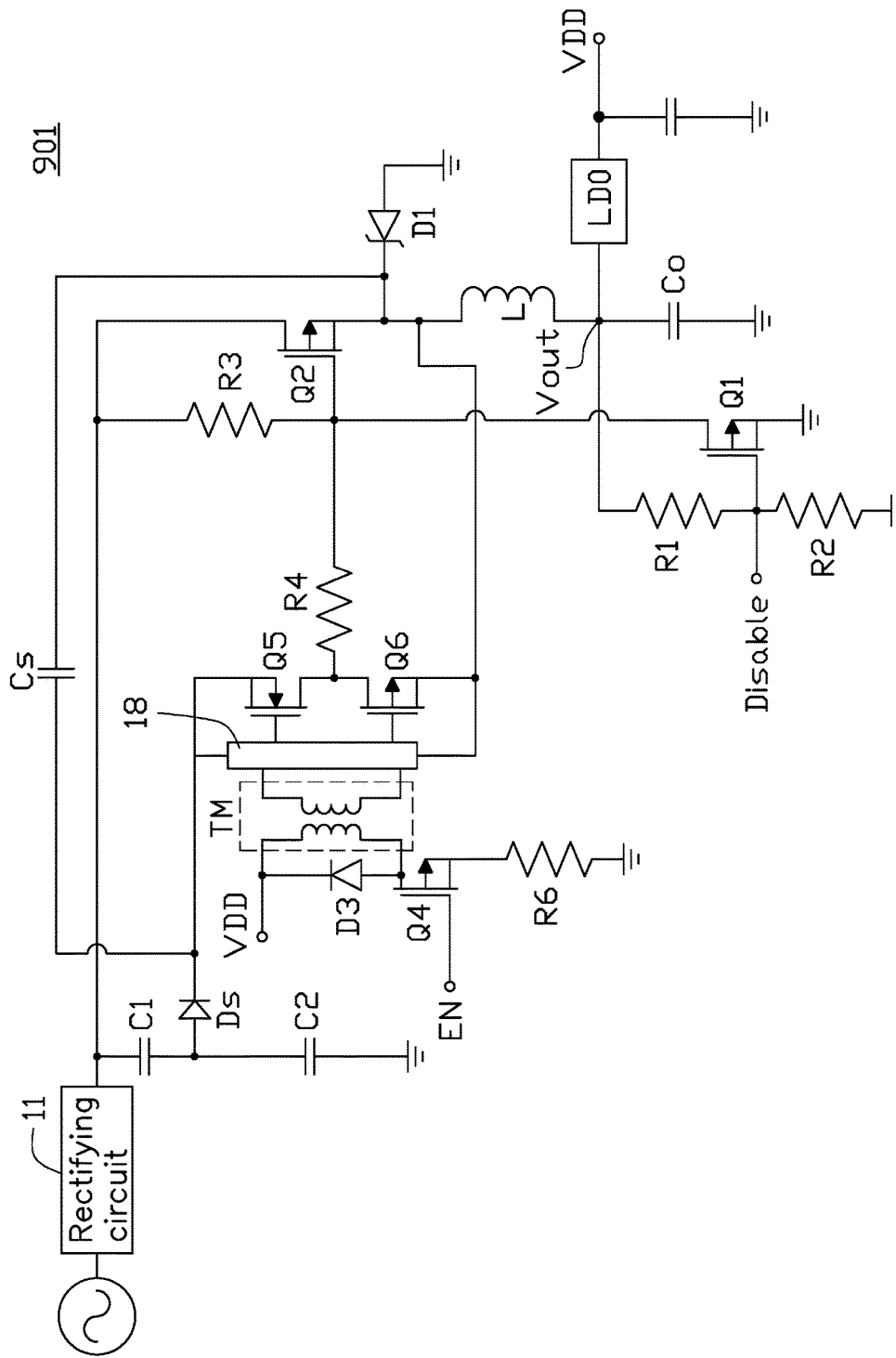
FIG. 16 is a diagrammatic view of a thirteenth embodiment of the ultra high voltage regulator.

FIG. 16 illustrates a thirteenth embodiment of the ultra high voltage regulator 901 with a similar structure of the ultra high voltage regulator 900. The differences between the ultra high voltage regulators 901 and 900 include: the photo coupler PC is replaced by a transformer TM, wherein the transformer TM has a primary winding connected between the direct voltage VDD and the drain of the transistor Q4, and a secondary winding connected to the amplifier & level shifter 18; a diode D3 is connected between two ends of the primary winding.

Figure 17:
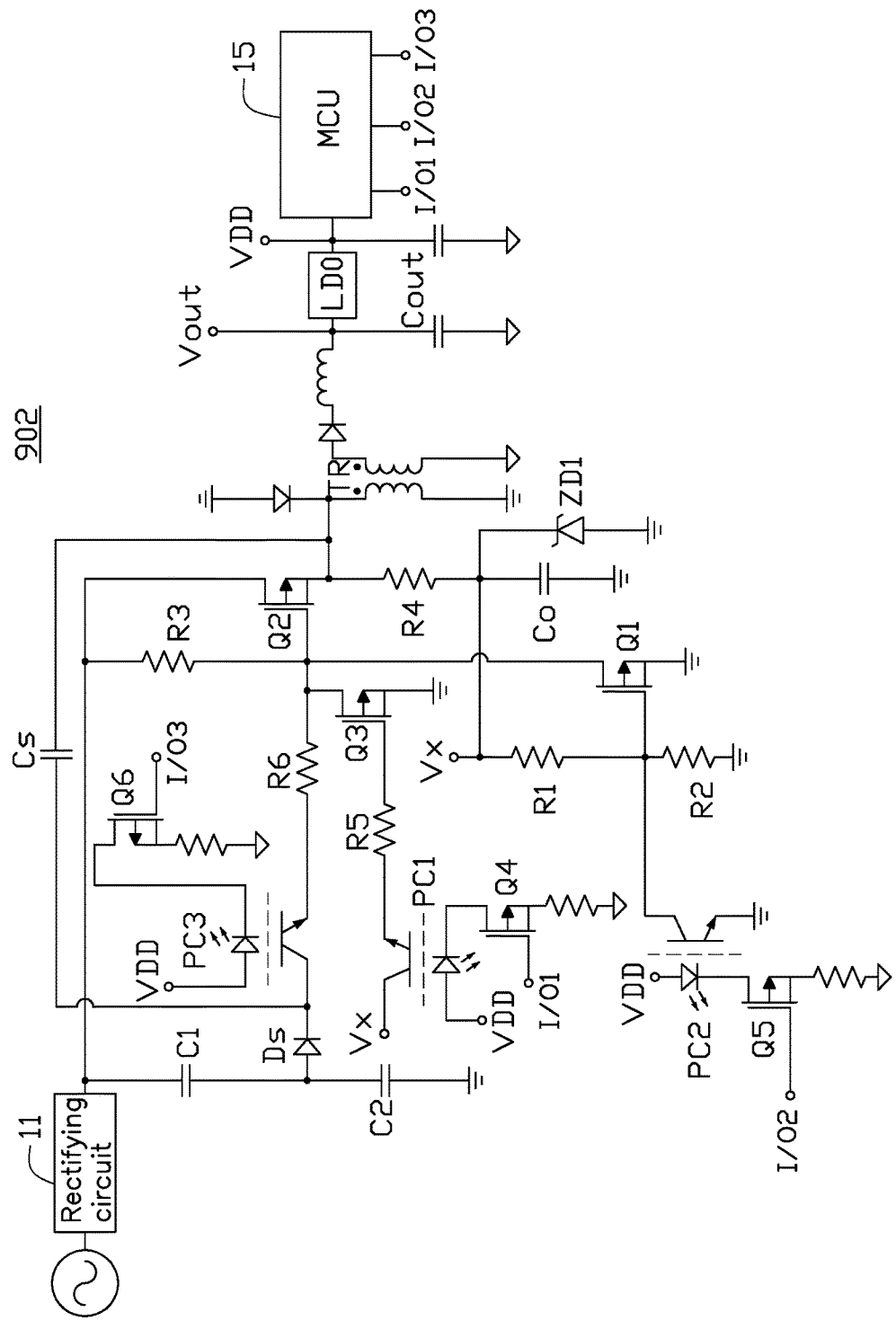
FIG. 17 is a diagrammatic view of a fourteenth embodiment of the ultra high voltage regulator.

FIG. 17 illustrates a fourteenth embodiment of the ultra high voltage regulator 902 with a similar structure of the ultra high voltage regulator 900. The ultra high voltage regulator 902 further comprises a transformer TR and first to third photo couplers PC1, PC2, PC3. The transformer TR has a primary winding connected to the source of the transistor Q2 and a secondary winding connected to the output terminal and outputting the output voltage Vout of the ultra high voltage regulator 901. The output terminal is also connected to ground via a capacitor Cout. The input of the low-dropout regulator LDO receives the output voltage Vout and outputs a low-dropout direct voltage VDD. The input of the MCU receives the direct voltage VDD and includes three input/output terminals I/O1, I/O2, I/O3. The first photo coupler PC1 includes a diode whose anode receiving the direct voltage VDD and cathode connected to the drain of the transistor Q4. The gate of the transistor Q4 is connected to the terminal I/O1. The source of the transistor Q4 is connected to ground via a resistor. A drain of a transistor of the first photo coupler PC1 receives a voltage Vx. A source of the transistor of the first photo coupler PC1 is connected to the gate of the transistor Q3 via a resistor R5. The second photo coupler PC2 includes a diode whose anode receiving the direct voltage VDD and cathode connected to the drain of the transistor Q5. The gate of the transistor Q5 is connected to the terminal I/O2. A drain of a transistor of the second photo coupler PC2 is connected to a node between the resistors R1, R2. A source of the transistor of the second photo coupler PC2 is grounded. A cathode of a Zener diode ZD1 is connected to the node between the resistor R4 and the capacitor Co, and an anode of the Zener diode ZD1 is grounded. The voltage Vx is connected to ground via the resistors R1, R2. A drain of a transistor of the third photo coupler PC3 is connected to the cathode of the diode Ds. A source of the transistor of the third photo coupler PC3 is connected to the gate of the transistor Q2 via a resistor R6.

The third photo coupler PC3 includes a diode whose anode receiving the direct voltage VDD and cathode connected to the drain of the transistor Q6. The gate of the transistor Q6 is connected to the terminal I/O3. The source of the transistor Q6 is connected to the ground via a resistor. In this embodiment, the transistors Q1, Q2, the resistors R1, R2, R3, R4, and the capacitor C0 corporately form an oscillator. Voltage output from the oscillator is transformed by the transformer TR. The transformed voltage charges the capacitor Cout to a certain voltage and the MCU 15 is activated to control the transistor Q2 at the primary winding side. The photo coupler PC2 controls the transistor Q1 to be turned on or off. The photo coupler PC1 controls the transistor Q3 to be turned on or off. The photo coupler PC3 drives the gate of the transistor Q2.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims.

What is claimed is:

1. An ultra high voltage regulator comprising:
an input terminal configured to receive an alternating current;
an output terminal configured to provide a direct voltage to an electrical component;
a rectifying circuit configured to generate a rectifying signal based on the received alternating current;
a first transistor including a first reference terminal, a first driving terminal, and a first controlling terminal;
a second transistor including a second reference terminal connected to an output of the rectifying circuit for receiving the rectifying signal, a second controlling terminal connected to the first reference terminal, and a second driving terminal connected to the output terminal;
an output capacitor with a terminal connected to the output terminal, and an opposite terminal connected to the ground;
a first resistor and a second resistor connected in series between the output terminal and the ground, a node between the first and second resistors connected to the first controlling terminal;
a bootstrap diode having an anode connected to the output of the rectifying circuit, and a cathode;
a bootstrap capacitor connected between the cathode of the bootstrap diode and the second driving terminal; and
a gate driver circuit connected between the cathode of the bootstrap diode and the second controlling terminal, to control on or off of the second transistor.

2. The ultra high voltage regulator of claim 1, further comprising a third transistor; wherein the third transistor comprises a third controlling terminal, a third driving terminal, and a third reference terminal; the third driving terminal is grounded, the third reference terminal is connected to the second controlling terminal; the third controlling terminal receives a first enable signal to turn on the third transistor.

3. The ultra high voltage regulator of claim 2, wherein the gate driver circuit comprises a fourth transistor, a fifth transistor, and a sixth transistor; the fourth transistor has a fourth controlling terminal receiving a second enable signal, a fourth driving terminal connected to the ground via a resistor, and a fourth reference terminal; the fifth transistor has a fifth controlling terminal connected to the fourth reference terminal and also to the cathode of the bootstrap diode via a resistor, a fifth driving terminal, and a fifth reference terminal; the sixth transistor has a sixth controlling terminal connected to the fifth driving terminal, a sixth driving terminal connected to the fifth reference terminal and also to the cathode of the bootstrap diode, and a sixth reference terminal connected to the second controlling terminal via a fourth resistor.

4. The ultra high voltage regulator of claim 2, wherein the gate driver circuit comprises a fourth transistor and a photo coupler; the photo coupler has a photo coupler diode and a photo coupler transistor; the fourth transistor has a fourth controlling terminal receiving a second enable signal, a fourth driving terminal connected to the ground via a resistor, and a fourth reference terminal connected to a cathode of the photo coupler diode; an anode of the photo coupler diode receives a direct voltage; a driving terminal of the photo coupler transistor is connected to the second controlling terminal, and a reference terminal of the photo coupler transistor is connected to the cathode of the bootstrap diode.

5. The ultra high voltage regulator of claim 4, further comprising a low-dropout regulator connected to the output terminal and outputting a low-dropout direct voltage to the anode of the photo coupler diode.

6. The ultra high voltage regulator of claim 1, further comprising a smoothing circuit that has an inductor and a flyback diode; wherein the inductor is connected between the output terminal and the second driving terminal; a cathode of the flyback diode is connected to the second driving terminal, and an anode of the flyback diode is grounded.

7. The ultra high voltage regulator of claim 1, further comprising a capacitor connected between the output of the rectifying circuit and the ground.

8. The ultra high voltage regulator of claim 7, further comprising a third resistor connected between the cathode of the bootstrap diode and the second controlling terminal.

9. The ultra high voltage regulator of claim 1, further comprising a first capacitor and a second capacitor connected in series between the output of the rectifying circuit and the ground; wherein the anode of the bootstrap diode is connected to a node between the first and second capacitors.

10. The ultra high voltage regulator of claim 9, further comprising a third resistor connected between the output of the rectifying circuit and the second controlling terminal.

11. The ultra high voltage regulator of claim 9, further comprising a transformer, wherein the transformer comprises a primary winding connected to the second driving terminal and a secondary winding connected to the output terminal.

12. The ultra high voltage regulator of claim 11, further comprising a micro control unit connected to the output terminal and having a first input/output terminal, a second input/output terminal, and a third input/output terminal.

13. The ultra high voltage regulator of claim 12, further comprising a low-dropout regulator connected between the output terminal and the micro control unit, and outputting a low-dropout direct voltage.

14. The ultra high voltage regulator of claim 12, further comprising a third transistor; wherein the third transistor comprises a third controlling terminal, a third driving terminal, and a third reference terminal; the third driving terminal is grounded, the third reference terminal is connected to the second controlling terminal; and the third controlling terminal receives an enable signal to turn on the third transistor.

15. The ultra high voltage regulator of claim 14, further comprising a first photo coupler and a fourth transistor, wherein the first photo coupler comprises a photo coupler diode and a photo coupler transistor; the photo coupler diode comprises an anode receiving a direct voltage and a cathode connected to a reference terminal of the fourth transistor; a controlling terminal of the fourth transistor is connected to the first input/output terminal; a driving terminal of the fourth transistor is connected to ground via a resistor; a reference terminal of the photo coupler transistor receives a direct current; and a driving terminal of the photo coupler transistor is connected to the third controlling terminal via a resistor.

16. The ultra high voltage regulator of claim 12, further comprising a second photo coupler and a fifth transistor, wherein the second photo coupler comprises a photo coupler diode and a photo coupler transistor; the photo coupler diode comprises an anode receiving a direct voltage and a cathode connected to a reference terminal of the fifth transistor; a controlling terminal of the fifth transistor is connected to the second input/output terminal; a reference terminal of the photo coupler transistor is connected to the node between the first and second resistors and connected to a direct voltage via the first resistor; and a driving terminal of the photo coupler transistor is grounded.

17. The ultra high voltage regulator of claim 12, wherein the gate driver circuit comprises a third photo coupler and a sixth transistor; the third photo coupler comprises a photo coupler diode and a photo coupler transistor; the photo coupler diode comprises an anode receiving a direct voltage and a cathode connected to a reference terminal of the sixth transistor; a controlling terminal of the sixth transistor is connected to the third input/output terminal; a driving terminal of the sixth transistor is grounded via a resistor; a reference terminal of the photo coupler transistor is connected to the cathode of the bootstrap diode; and a driving terminal of the photo coupler transistor is connected to the second controlling terminal via a sixth resistor.

18. The ultra high voltage regulator of claim 9, wherein the gate driver circuit comprises a fourth transistor, a photo coupler, an amplifier and level shifter, a fifth transistor, and a sixth transistor; the photo coupler has a photo coupler diode and a pin diode; the fourth transistor has a fourth controlling terminal receiving a second enable signal, a fourth driving terminal connected to the ground via a resistor, and a fourth reference terminal connected to a cathode of the photo coupler diode; an anode of the photo coupler diode receives a direct voltage; two ends of the pin diode is connected to the amplifier and level shifter; outputs of the amplifier and level shifter are connected to controlling terminals of the fifth and sixth transistors; a driving terminal of the fifth transistor is connected to the cathode of the bootstrap diode, a driving terminal of the sixth transistor is connected to the second driving terminal, the driving terminals of the fifth and sixth transistors are connected to the amplifier & level shifter, and referencing terminals of the fifth and sixth transistors are connected to each other and also to the second controlling terminal via a resistor.

19. The ultra high voltage regulator of claim 9, wherein the gate driver circuit comprises a fourth transistor, a transformer, an amplifier and level shifter, a fifth transistor, and a sixth transistor; the fourth transistor has a fourth controlling terminal receiving an enable signal, a fourth driving terminal connected to the ground via a resistor, and a fourth reference terminal; the transformer has a primary winding and secondary winding; the primary winding is connected between a direct voltage and the fourth reference terminal; the secondary winding is connected to the amplifier and level shifter; outputs of the amplifier and level shifter are connected to controlling terminals of the fifth and sixth transistors; a driving terminal of the fifth transistor is connected to the cathode of the bootstrap diode, a driving terminal of the sixth transistor is connected to the second driving terminal, the driving terminals of the fifth and sixth transistors are connected to the amplifier & level shifter, and referencing terminals of the fifth and sixth transistors are connected to each other and also to the second controlling terminal via a resistor.

* * * * *